Nov. 16, 1965     B. D. DE GEERE     3,217,478
HIGH CLIPPING ATTACHMENT FOR FIELD MOWERS
Filed Oct. 10, 1962
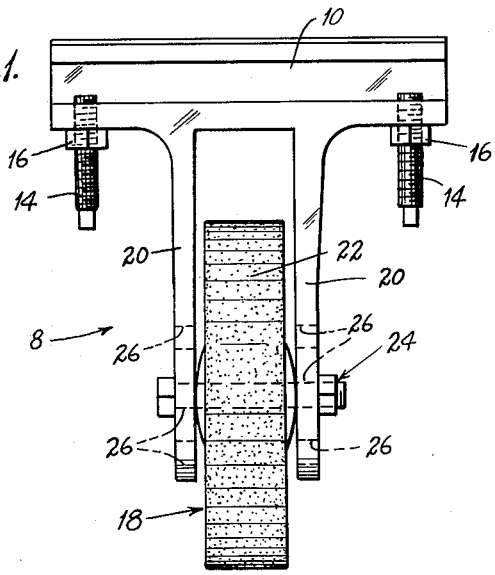
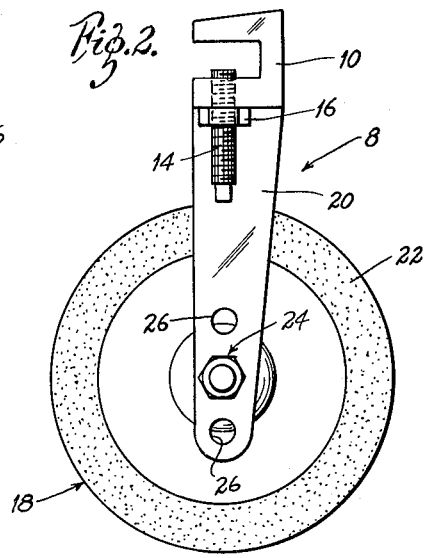
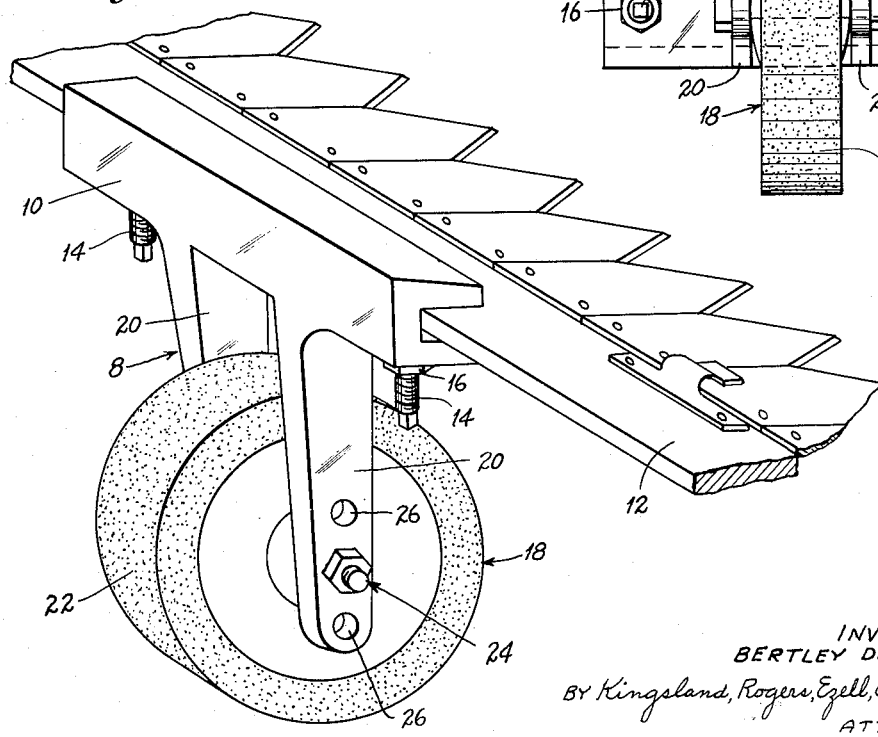
INVENTOR:
BERTLEY DEAN DEGEERE,
BY Kingsland, Rogers, Ezell, Eilers & Robbins
ATTORNEYS

3,217,478
HIGH CLIPPING ATTACHMENT FOR FIELD MOWERS
Bertley Dean De Geere, 2607 N. Oakland,
Springfield, Mo.
Filed Oct. 10, 1962, Ser. No. 229,637
2 Claims. (Cl. 56—228)

The present invention relates generally to agricultural machine attachments, and more particularly to a novel attachment for field mowers for predetermining the cutting height of the intermediate portion of the cutter blades.

In brief, the present invention includes a bracket having a horizontal upper portion of channel cross-section for attachment to the rear edge of a cutter bar, means for removably securing said portion in position, spaced legs depending from said upper portion, and a ground wheel mounted therebetween for vertical adjustment.

Hence, objects of the present invention are to provide a novel attachment for field mowers for predetermining the cutting height of the cutting bar which can be easily and readily attached to and removed from a cutting bar, which may be attached in selected position to eliminate cutter bar sagging, which enables higher ground speed of the mower, which eliminates or reduces clogging of the cutters with severed material, which is of sturdy construction, which can be firmly secured in operative position, and which otherwise fulfills the objects and advantages sought therefor.

The foregoing and other objects and advantages are apparent from the following description taken with the accompanying drawings, in which:

FIGURE 1 is a front elevational view of a field mower attachment constructed in accordance with the teachings of the present invention;

FIGURE 2 is a side elevational view thereof;

FIGURE 3 is a bottom plan view thereof; and

FIGURE 4 is a fragmentary view showing the present novel field mower attachment mounted on the rear of a sickle bar.

Referring to the drawings more particularly by reference numerals, the reference numeral 8 indicates a field mower attachment incorporating the principles of the present invention. The attachment 8 may comprise a supporting frame 10 in the form of a metal casting or weldment which is attached to the back side of any make or model of field mower cutter bar, as cutter bar 12 in FIGURE 4, by means of two or more heavy duty hardened set screws 14 and lock or jam nuts 16. The attachment 8 is designed and constructed to use a rubber tired wheel 18 between depending legs 20 in any of one or more positions which regulate the height of a cutter bar in relationship to the ground. Said wheel 18 in making contact with the ground eliminates drag and free bounce of the cutter bar 12 while permitting faster ground speed of the equipment being used as it maintains the predetermined cutting height.

The frame 10 may be constructed by the use of molten steel poured into moulds used in common practice made with a pattern and cores of the proper shape and dimensions, or by fabrication with the use of commonly stocked steel shapes and the welding of joints by the electric welding processes in common or ordinary use. Such a casting or weldment is then machined by the common machine shop practices, such as drilling and threading of service holes.

The wheel 18 used may be of common manufacture consisting of a steel die stamped body with hub bearings of either self lubricating bronze, ball, or roller. The outer rim of the wheel 18 is of solid, semi-pneumatic, or pneumatic rubber tire construction, a solid tire 22 being shown. The wheel 18 is mounted between the legs 20 by means of a common axle bolt and nut or pin assembly 24.

The wheel 18 may be located in any one of the two or more positions provided to hold the field mower cutter bar 12 at a predetermined height for clipping weeds or other growths of like nature from fields and pasture lands. Aligned apertures 26 in the legs 20 provide this selective vertical positioning.

It is apparent that there has been provided a novel attachment for field mowers which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a cutting height determining attachment for field mowers comprising a frame including an upper elongated horizontal portion of channel cross-section, the bight of which is in a substantially vertical plane when said attachment is in use, the legs of the said portion being substantially horizontal, parallel, vertically spaced, and of equal length, means for removably mounting said attachment on the rear of a mower bar with the channel engaging the same with the legs thereof positioned above and below the mower bar, at least one leg member depending from said upper portion, and a wheel adjustably supported below said upper portion and adjacent said leg for engagement with the ground.

2. The combination of claim 1 in which said mounting means comprises sturdy setscrews for engaging a mower bar and pressing the mower bar and the upper leg of the said portion tightly together and jam nuts which can be readily actuated with simple tools in mounting and removing said attachment.

References Cited by the Examiner
UNITED STATES PATENTS

| | | | |
|---|---|---|---|
| 496,285 | 4/1893 | Stely | 280—47.32 X |
| 946,842 | 1/1910 | Haas | 280—47.32 X |
| 1,338,657 | 4/1920 | Trumpour | 280—47.32 X |
| 1,620,688 | 3/1927 | Rehn | 280—96.1 |
| 2,155,183 | 4/1939 | Dursch | 56—296 |
| 2,168,440 | 8/1939 | Dole | 280—47.15 X |
| 2,251,637 | 8/1941 | Ronning | 56—26.5 |
| 2,485,312 | 10/1949 | Powell | 280—47.15 X |
| 2,834,608 | 5/1958 | Wixson | 280—150 |
| 2,896,650 | 7/1959 | Eigner. | |
| 3,055,674 | 9/1962 | Karwatt | 280—47.13 |

BENJAMIN HERSH, *Primary Examiner.*

A. HARRY LEVY, PHILIP ARNOLD, *Examiners.*